United States Patent
Frantz et al.

(10) Patent No.: US 9,955,414 B2
(45) Date of Patent: *Apr. 24, 2018

(54) SELECTING A NETWORK FOR A WIRELESS DEVICE

(71) Applicant: QUALCOMM Incorporated, San Diego, CA (US)

(72) Inventors: William T. Frantz, San Diego, CA (US); Shriram Ganesh, San Diego, CA (US); Timothy K. Kerssen, San Diego, CA (US); Siddharth Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,687

(22) Filed: Jun. 21, 2016

(65) Prior Publication Data

US 2016/0302139 A1 Oct. 13, 2016

Related U.S. Application Data

(63) Continuation of application No. 13/830,520, filed on Mar. 14, 2013, now Pat. No. 9,398,525.

(51) Int. Cl.
| | |
|---|---|
| *H04W 48/18* | (2009.01) |
| *H04W 36/34* | (2009.01) |
| *H04W 36/36* | (2009.01) |
| H04W 88/06 | (2009.01) |
| H04W 84/12 | (2009.01) |

(52) U.S. Cl.
CPC ........... *H04W 48/18* (2013.01); *H04W 36/34* (2013.01); *H04W 36/36* (2013.01); *H04W 36/365* (2013.01); *H04W 84/12* (2013.01); *H04W 88/06* (2013.01)

(58) Field of Classification Search
CPC ..... H04W 47/17; H04W 48/18; H04W 48/20; H04W 36/34; H04W 36/36; H04W 36/365

See application file for complete search history.

(56) References Cited

U.S. PATENT DOCUMENTS

| | | | |
|---|---|---|---|
| 7,599,323 | B2 | 10/2009 | Chandranmenon et al. |
| 7,821,985 | B2 | 10/2010 | Van et al. |
| 7,996,505 | B2 | 8/2011 | Krantz et al. |

(Continued)

FOREIGN PATENT DOCUMENTS

| | | |
|---|---|---|
| CN | 1601961 A | 3/2005 |
| CN | 1716900 A | 1/2006 |

(Continued)

OTHER PUBLICATIONS

A. Burchill, How to use Group Policy to black/white list wireless networks in Vista & Windows 7, Mar. 23, 2010, pp. 1-21.*

(Continued)

*Primary Examiner* — Christopher Crutchfield (74) *Attorney, Agent, or Firm* — Kilpatrick Townsend & Stockton (57) ABSTRACT

Disclosed is an apparatus, system, and method for a wireless device to select a network. The wireless device receives a request from a user to access a network site. The wireless device then selects a network based upon a predefined weighted criteria setting that was previously selected by the user.

28 Claims, 4 Drawing Sheets

(56) References Cited

U.S. PATENT DOCUMENTS

| | | |
|---|---|---|
| 8,010,105 B2 | 8/2011 | Buckley et al. |
| 8,788,715 B2 | 7/2014 | Krantz et al. |
| 2004/0233868 A1* | 11/2004 | Farnham .............. H04W 48/18 370/329 |
| 2005/0239497 A1 | 10/2005 | Bahl et al. |
| 2006/0268711 A1 | 11/2006 | Doradla et al. |
| 2008/0233951 A1 | 9/2008 | Uchida et al. |
| 2008/0301017 A1 | 12/2008 | Dawson et al. |
| 2009/0135749 A1 | 5/2009 | Yang |
| 2009/0180429 A1 | 7/2009 | Stevens et al. |
| 2009/0249463 A1* | 10/2009 | Chhabra ............. H04L 63/0823 726/10 |
| 2009/0258672 A1* | 10/2009 | Camp, Jr. ............ H04W 48/18 455/553.1 |
| 2010/0124196 A1 | 5/2010 | Bonar et al. |
| 2010/0177711 A1* | 7/2010 | Gum .................... H04W 88/06 370/329 |
| 2010/0178919 A1 | 7/2010 | Deepak et al. |
| 2010/0184440 A1 | 7/2010 | Mao et al. |
| 2011/0194541 A1 | 8/2011 | Menaceur et al. |
| 2011/0208866 A1 | 8/2011 | Marmolejo-Meillon et al. |
| 2011/0280179 A1 | 11/2011 | Sachs |
| 2012/0039262 A1 | 2/2012 | Walsh |
| 2012/0122448 A1 | 5/2012 | Mueck et al. |
| 2012/0196644 A1 | 8/2012 | Scherzer et al. |
| 2012/0260158 A1* | 10/2012 | Steelberg .............. G06Q 30/02 715/234 |
| 2013/0005350 A1* | 1/2013 | Campos ............... H04W 48/18 455/456.1 |
| 2013/0155876 A1* | 6/2013 | Potra .................... H04W 36/14 370/248 |
| 2014/0220967 A1 | 8/2014 | Pankajakshan et al. |
| 2014/0269495 A1 | 9/2014 | Frantz et al. |

FOREIGN PATENT DOCUMENTS

| | | |
|---|---|---|
| EP | 2111054 A1 | 10/2009 |
| JP | 2004096377 A | 3/2004 |
| JP | 2008199126 A | 8/2008 |
| WO | 2010090809 A2 | 8/2010 |

OTHER PUBLICATIONS

International Search Report and Written Opinion—PCT/US2014/020895—ISA/EPO—dated Jul. 25, 2014.

* cited by examiner

SELECTING A NETWORK FOR A WIRELESS DEVICE

CROSS-REFERENCE TO RELATED APPLICATION

This application is a continuation of U.S. patent application Ser. No. 13/830,520, filed Mar. 14, 2013 entitled, "SELECTING A NETWORK FOR A WIRELESS DEVICE," which is herein incorporated by reference.

BACKGROUND

Field

The present invention relates to an apparatus and method to select a network for a wireless device.

Relevant Background

Many wireless devices support multiple network connections such as cellular networks and wireless local area networks (WLANs) (e.g., WiFi). Unfortunately, there is little intelligence behind deciding which network to use. In many cases, these types of networks have significant differences in speed, security, cost, and access (e.g., content filtering). For example, as to security, a public WiFi hotspot may be susceptible to hacking attempts as unknown strangers can eavesdrop on unencrypted communications. On the other hand, a corporate WiFi hotspot may be more secure but may also employ a content filtering system to limit access to unapproved websites. Cellular networks ensure security and avoid content filters, but are costly and slower.

When security is a concern, a common approach currently utilized is to use a secure connection such as Hypertext Transfer Protocol Secure (HTTPS) or a virtual private network (VPN). However, those solutions may not always be available. In particular, not all networks offer HTTPS connectivity and most VPN services are relatively expensive and require additional steps to login.

Further, as to access, oftentimes a firewall filter may block access, such that the only alternative is for the user to manually switch the wireless device from WiFi to a cellular network for connectivity. This forces all communications through a slower, more expensive connection when such a connection is not needed for most of the other communications being performed by the wireless device.

SUMMARY

Aspects of the invention may relate to an apparatus, system, and method for a wireless device to select a network. The wireless device receives a request from a user to access a network site. The wireless device then selects a network based upon a predefined weighted criteria setting that was previously selected by the user.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Embodiments of the invention relate to an approach to have a wireless device automatically select a network based upon utilizing predefined user criteria settings that have been previously selected and weighted by the user. For example, in cases where privacy and filtering are not issues of concern to a user, as identified by user predefined weighted criteria settings, the wireless device may automatically select a fast and cheap public wireless local area network area (e.g., WLAN) connection such as a Wi-Fi connection through a public WiFi router. In cases where security and access are of concern (e.g., a firewall filter may block access to a website) to a user, as identified by user predefined weighted criteria settings, then the wireless device may automatically select a cellular connection, which may be slower and/or more expensive, but is free from filtering and is inherently more secure.

Therefore, embodiments of the invention may relate to a method, system, and apparatus for a wireless device to automatically select a network based upon user predefined weighted criteria settings.

Figure 1:
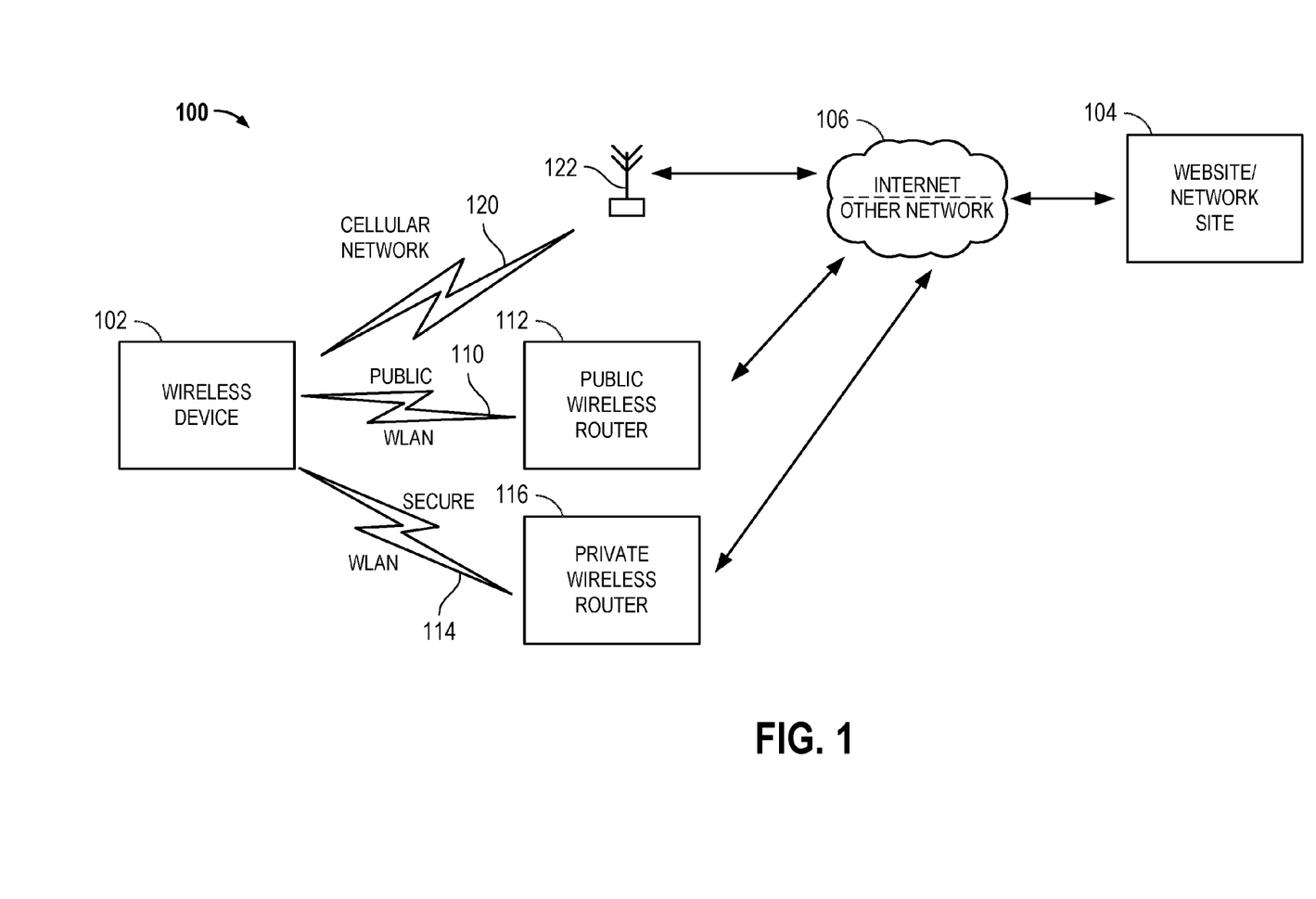
FIG. 1 is a diagram of a system in which aspects of the invention related to a wireless device that selects a network may be practiced.

With additional reference to FIG. 1, an example of an environment 100, in which embodiments of the invention may be practiced, is illustrated. As an example, a wireless device 102 receives a request from a user to access a particular network site 104. Examples of this may include a website 104, such as, a bank website, a medical website, an on-line store website, etc. Also, a particular private network site 104, such as, a corporate site, a university site, a government site, etc., may be accessed which typically utilize virtual private networks (VPNs) that require particular logins, passwords, etc. According to embodiments of the invention, wireless device 102 may select a network (e.g., a public WLAN 110, a private/secure WLAN 114, or a cellular network 120), based upon user predefined weighted criteria settings.

As an example, access to a website 104 through the Internet 106 may be requested at the wireless device 102 or access to another type of a network site 104 through another type of network 104 (e.g., VPN corporate, VPN private, VPN government, etc.) may be requested. Based upon the user predefined weighted criteria settings, wireless device 102 may select a network. The network typically includes a public WLAN 110 through public wireless router 112 (hereinafter public WiFi router 112), a secure WLAN (e.g., VPN corporate, VPN private, VPN government, etc.) through a private wireless router 116 (hereinafter private WiFi router 116), or a cellular network 120 (e.g., 3G, 4G, LTE, EDGE, etc.) utilizing a base station 122, etc. Additionally, as will be described, a wired network connection may be selected if the wireless device has a network interface that is connected via a wire to a network access device.

The user pre-defined criteria setting may include one or more of a security setting, an access setting, a speed setting, a cost setting, a power setting, or other preference settings. Further, each of the pre-defined criteria settings may include a weighting factor that is selected by a user.

As examples, if the speed setting includes a high weighting factor by the user, then the network selected by the wireless device 102 may be a public WLAN 110 that utilizes a public Wi-Fi router 112 to access an Internet website 104. On the other hand, if the security setting includes a high weighting factor as selected by the user, then the wireless device 102 may select a network that is a secure WLAN 114 that includes a private WiFi router 116 (e.g., a corporate Wi-Fi router) or a cellular network 120 to access a particular website. As another example, if the cost setting includes a high weighting factor selected by the user, the wireless network device 102 may select a network that utilizes a public WLAN 110 through a public Wi-Fi router 112 to access a website 104. As yet another example, if the access setting includes a high weighting factor by the user (e.g., to avoid firewalls), then the wireless device 102 may select a cellular network 120 to access a website 104 through the Internet 106. Various other examples will be hereinafter described in more detail. Also, as will be described, a wired network connection may be selected if the wireless device has a network interface that is connected via a wire to a network access device, which may be selected when, for example, security or speed are highly weighted predefined criteria settings.

Figure 2:
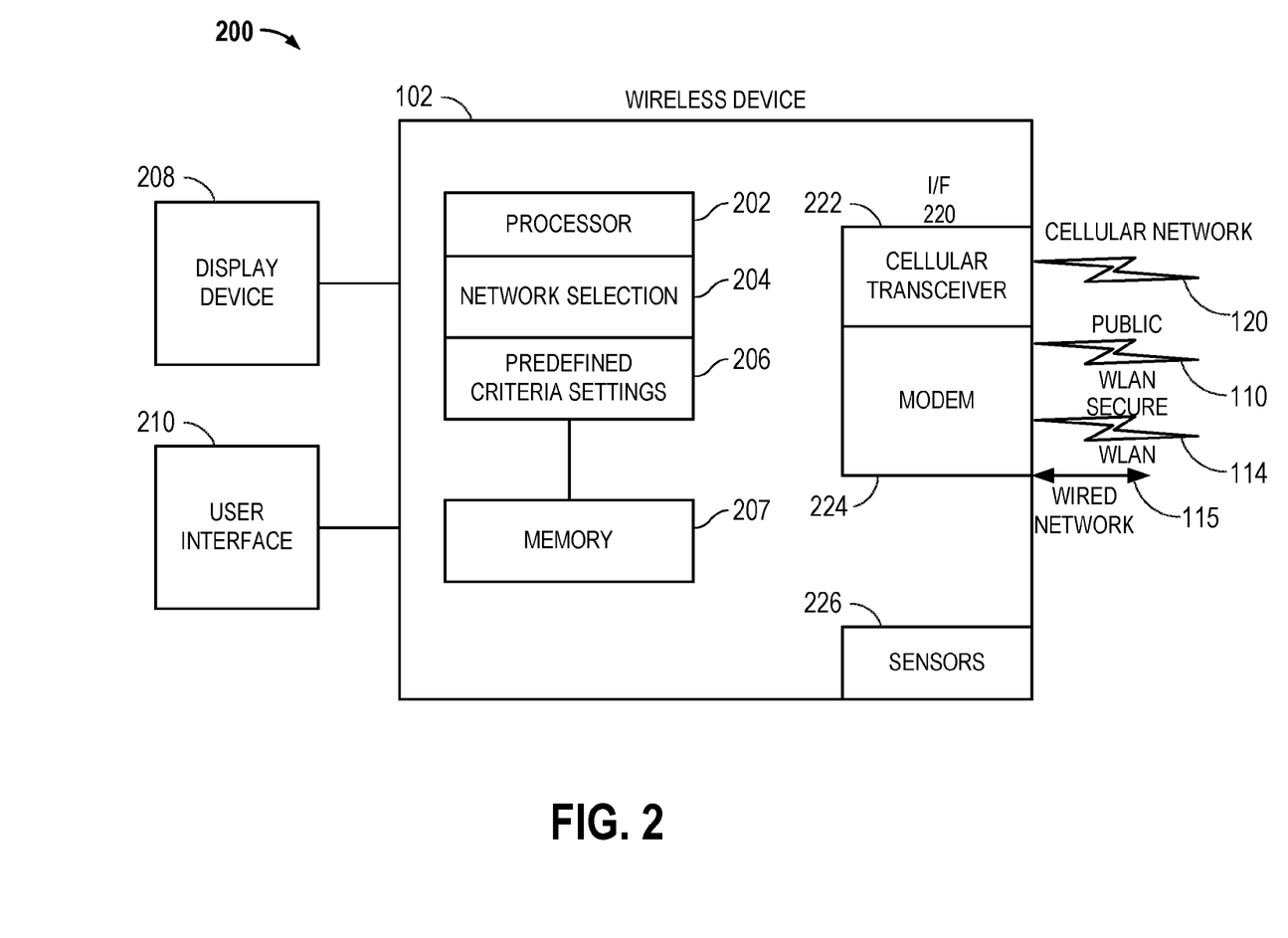
FIG. 2 is a diagram illustrating an example of wireless device that may select a network.

With reference to FIG. 2, FIG. 2 is a diagram of a wireless device 102 that may include a processor 202, a memory 207, a display device 208, a user interface 210, a network interface (I/F) 220, and sensors 226. Processor 202 may be configured to execute operations to be hereinafter described. Particularly, processor 202 may implement network selection functionality 204 and predefined criteria settings 206 that are selected and weighted by a user, which will be hereinafter described. Memory 207 may store operations, applications, programs, routines, etc., to aid in implementing these operations and functions.

Wireless device 102 may also include common device features such as a display device 208, a user interface 210 (e.g., a keyboard, a keypad, touch screen input, etc.), and a network interface (I/F) 220. As will be described, wireless device 102 may be any type of computing device that has wireless capability, such as: personal computers, desktop computers, laptop computers, mobile computers, mobile devices, personal digital assistants, wireless phones, cell phones, smart phones, tablets, machine-to-machine (M2M) devices, or any type of computing device that includes wireless capabilities.

Wireless device 102 may include a variety of different types of I/Fs 220 for wireless communication through a wireless network (e.g., WLANs, cellular networks, etc.). As examples, wireless device 102 may include a cellular transceiver 222 (e.g., including a transmitter and receiver) that may communicate with a cellular network 120 including a base station 122 to enable voice communication as well as digital data communication via the Internet 106 and other networks 106 in order to access a website or another type of network site 104. Further, wireless device 102 may include a wireless modem 224 (e.g., a wireless transceiver that includes a wireless receiver and transmitter) to receive and transmit data through public and private WLANs 110 and 114 utilizing associated public and private Wi-Fi routers 112 and 116. In this way, cellular and Wi-Fi communication is enabled for wireless device 102 to access websites and/or other network sites 104 through the Internet and other networks 106. Furthermore, modem 224 may be a wire-connectable modem such that wireless device 102 may also be connected via a cable/wire to a wired network 115 (e.g., via a network access device). Examples of wire-based connections may include a modem connected via a wire/cable to a router, modem, or another type of network access device. Many types of wired connectors such as cables, Ethernet cables for Ethernet systems, Universal Serial Bus (USB) cables, etc., may be utilized. As examples, via this type of wireless or wired communication implementation, access may be enabled to websites 104 associated with banking, hospitals, and on-line stores for purchases as well as other network sites (e.g., corporate, university, government, etc.) via VPNs, etc. It should be appreciated that these are merely examples and that any type of network, website, network site, may utilize embodiments of the invention.

Further, wireless device 102 may include sensors 226 including proximity sensors, motion sensors, accelerometer sensors, position sensors, location sensors, pressure sensors, microphones, cameras, sound sensors, light sensor, etc., to implement various features commonly associated with wireless devices 102.

Therefore, in one embodiment, wireless device 102 under the control of processor 202 may receive a request from a user (e.g., through user interface 210) to access a particular network site 104 and, based upon this request, utilizing the network selection functionality 204 and predefined criteria settings set by the user 206 that are weighted, may select the network based upon the weighted user predefined criteria settings.

Figure 3:
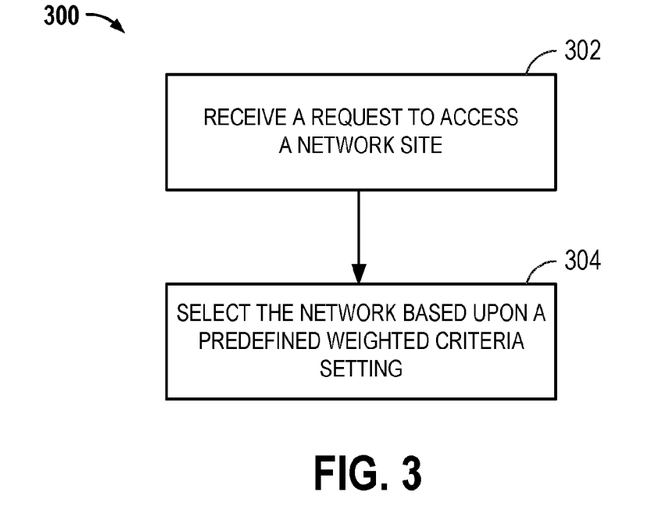
FIG. 3 is a flow diagram illustrating an example of a process to select a network.

With brief reference to FIG. 3, FIG. 3 is flow chart illustrating a process 300 to select a network. For example, wireless device 102 receives a request to access a network site 104 (block 302). Next, process 300 selects a network based upon the predefined weighted criteria settings set by a user (block 304).

Figure 4:
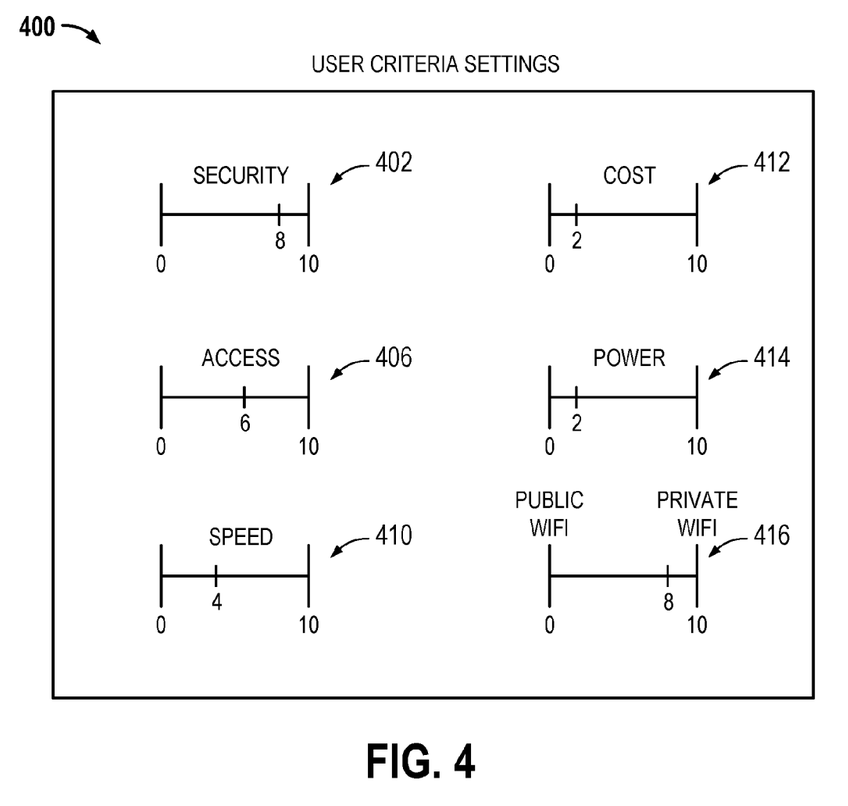
FIG. 4 is a diagram illustrating examples of selectable user criteria settings that may be weighted.

With additional reference to FIG. 4, a diagram showing user criteria settings 400 that may be selected by a user of the wireless device 102 to identify the user's preferences for selecting a network, as well as their weightings for each criteria setting, is illustrated. For example, the user criteria settings 400 may be displayed on the display device 208 of the wireless device 102 to allow the user to select the types of criteria settings and to place preference weights for each of the user selectable criteria settings 400.

Examples of criteria settings 400 and weights associated with those criteria settings will be hereinafter described. For example, a criteria setting for security 402 may be selected and weighted (e.g., weighting 8) by a user. Further, a criteria setting for access 406 may be selected and weighted (e.g., weighting 6) by a user. As yet another example, a criteria setting for speed 410 may be selected and weighted (e.g., weighting 4) by a user. Moreover, a criteria setting for cost 412 may be selected and weighed (e.g., weighting 2) by a user. Also, a criteria setting for power 414 may be selected and weighed (e.g., weighting 2) by a user. Additionally, a criteria setting 416 to emphasize public vs. private Wi-Fi selections may be selected and weighted by a user. In this instance, the weighting for private Wi-Fi is set to 8. In particular, it should be appreciated that these are just example weightings and that any weightings may be chosen by a user and further different schemes of weighting may also be utilized.

Based upon the predefined user criteria settings that are selected and weighted by a user, when a wireless device 102 receives a request to access a network site 104, a network is selected by the wireless device 102 based upon the weighted predefined criteria settings 400 as selected and weighted by a user. It should be appreciated that this is just an example of possible criteria settings that may or may not be utilized (e.g., they may be selected or deselected) and may or may not be weighted, based upon user preferences. Moreover, a wide variety of additional or different criteria settings may be utilized, these being merely examples.

Particular examples will be hereinafter described. For example, if a user has selected a highly weighted security criteria setting 402 (e.g., weighting 8) then the network automatically selected by the wireless device 102 will be a cellular network 120 to access a website 104 or a secure WLAN 114 through a private WiFi router 116 to access a website 104. For example, this may be for a banking transaction with a banking website 104 or for utilizing a credit card to make a purchase from an on-line store website 104. Additionally, assuming the wireless device 102 is connected directly via a cable to a network access device to form a wired network 115, the wired network may be chosen as the wired network provides a great degree of security.

As to private WiFi routers, a private WiFi router 116, such as through a corporation, provides extra security in that a login and password are often required to validate a VPN, thereby providing extra security while still maintaining high speed interaction with a website 104.

Continuing with this example, if the WiFi setting 416 also has a high weighting to private WiFi (e.g., weighting 8 to private WiFi) then the network automatically selected by the wireless device 102 would be to utilize a private Wi-Fi router 116 (e.g., a corporate or home router) to access a website 104.

As another example, if the speed setting 410 is selected by a user of the wireless device 102 to have a high weighting (e.g., weighting 10), then the network selected by the wireless device 102 will typically be a public WLAN 110 utilizing a public WiFi router 112. As an example, if a user is merely surfing news websites at a coffee shop, and selected high speed by a high weighting of the speed criteria 410, and security is not a concern (based upon a low weighting of the security criteria 402 by the user), then the public WiFi router 112 at the coffee shop may be automatically selected by the wireless device 102 to access the news website 104 on the Internet 106. On the other hand, assuming the wireless device 102 is connected directly via a cable to a network access device to form a wired network 115 at the coffee shop, the wired network may be chosen, as the wired network provides a very high speed connection. Additionally, the wired connection provides a great degree of security as well.

As yet another example, if the user has selected the cost setting 412 to have a high weighting, as they are concerned with costs, and not so much security (e.g., the security criteria setting 402 has a low weighting), then the network automatically selected by the wireless device 102 would be a public WiFi router 112, since that is much cheaper than utilizing a cellular network 120. Such an example may be a user performing GOOGLE searches over the Internet 106 at a mall having a public WiFi router 112.

As an additional example, if a user has selected a high weighting for security (e.g., predefined security criteria settings 402 with a weighting factor of 8) to avoid eavesdropping, when the user requests a connection to a website through their wireless device 102, but the website 104 does not support HTTPS connections, then the wireless device 102 would automatically select a cellular network connection 120, or a secure WiFi router 116 connection (if available), rather than a public WiFi router 112. An example of this may be a user requesting an on-line purchase from an on-line website store 104 at a mall (after seeing a particular item they wish to purchase—but not at the store itself), such that instead of the public wireless router 112, the wireless device 102 automatically selects a cellular network 120. As another example, assuming the wireless device 102 is connected directly via a cable to a network access device to form a wired network 115 at the mall (e.g., in a lounging area, at a bookstore, at a cafe, etc.), the wired network may be chosen, as the wired network provides a great degree of security.

As yet another example, to enable access and to avoid content filtering, in which the access criteria setting 406 has been highly weighted by a user (e.g., weighted to 9 by a user), the wireless device 102 may automatically select a cellular network 120 for connecting to a website 104 because cellular networks 120 typically do not impose any content filtering or firewall protection. In contrast, oftentimes both public wireless routers 112 and private wireless routers 116 impose content filtering. In this way, a user may not obtain access to a gambling website at work (filtered by their private corporate WiFi router 116) or access to a gambling website at a mall (filtered by their public WiFi router 112).

It should be appreciated, that wireless device 102 may first attempt to connect to a website 104 using the fastest available network such as a public Wi-Fi router 112. However, once the wireless device 102 encounters a firewall with content filtering rules, which blocks access to the desired website 104, then the wireless device 102 may automatically select a cellular network 120 to attempt the connection again.

As another example, when security 402 is not of concern and is weighted lowly (security weighting set at 2) by the user, and the costs 412 and speed 402 are of concern to the user and are highly weighted by the user (speed and cost weighing each set at 10), in this instance, public and/or private Wi-Fi 112 and 116 may typically be automatically selected by the wireless device 102 over a cellular network 120.

Figure 5:
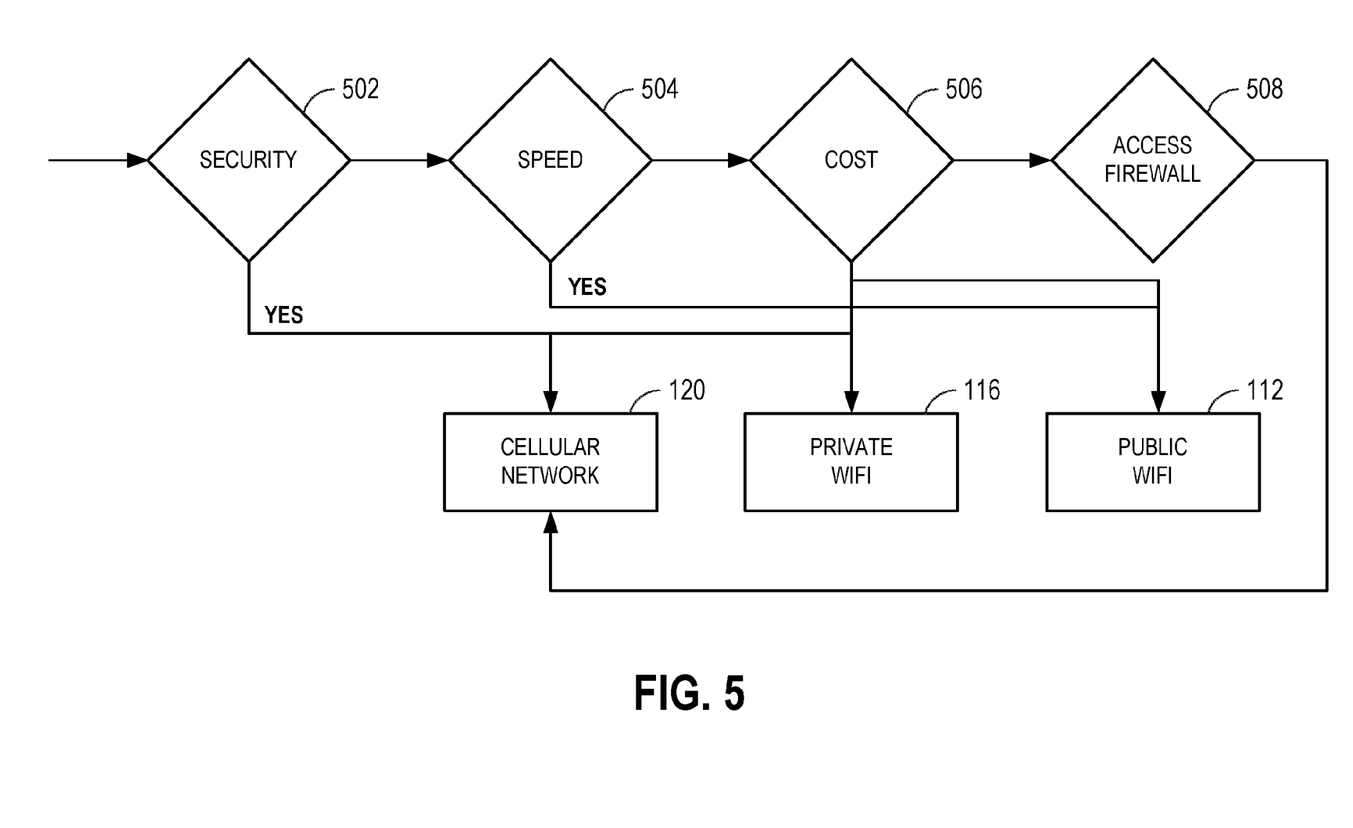
FIG. 5 is a flow diagram illustrating an example of selectable user criteria settings and networks.

With brief reference to FIG. 5, a very particular example is illustrated. For example, if security 502 is highly weighted as a concern by the user, then a cellular network 120 or a private WiFi router 116 is selected by the wireless device 102 for usage. Additionally, assuming the wireless device 102 is connected directly via a cable to a network access device to form a wired network 115, the wired network may be chosen as the wired network provides a great degree of security. If speed 504 is highly weighted as a concern by the user, then a private WiFi router 116 or a public WiFi router 112 is selected by the wireless device 102 for usage. Again, in this instance, a wired network may be chosen (if connected) as wired connections often provide a very high speed connection. Further, if cost 504 is highly weighted as a concern by the user, then a private WiFi router 116 or a public WiFi router 112 is selected by the wireless device 102 for usage. Additionally, if access/firewall prevention 504 is highly weighted as a concern by the user, then a cellular network 120 is selected by the wireless device 102 for usage. It should be appreciated that this is a simple example of utilizing purely highly weighted user criteria settings, and as previously described, a wide variety of differing weightings of differing user criteria settings, as selected by the user, may be utilized by the wireless device 102 to select the network for usage.

It should be appreciated that a wide variety of different types of user criteria settings may be defined for selection by a user of the wireless device 102 and may be differently weighted by the user. This allows the user to balance security, access, speed, cost, etc. Additionally, a power criteria setting 414 may be selected and weighted by the user to emphasize or deemphasize power usage of the wireless device 102. For example, the use of cellular networks typically requires more power and use of the battery of the wireless device 102 than public or private WiFi access. It should be appreciated that previously described criteria settings are merely examples that may or may not be utilized and may or may not be weighted, based upon user preferences, and that a wide variety of additional or different criteria settings may be utilized, these being merely examples.

Also, it should be appreciated that the nature of the application being implemented by the wireless device 102, the service being implemented by the wireless device 102, or the website being visited by the wireless device 102, in conjunction with the predefined criteria settings that are weighed by the user, may also be used by the wireless device 102 to automatically select the network (e.g., a cellular network 120, a public WiFi network 112, private a WiFi network 116, or a wired network 115). For example, an application that is utilized to access a bank website and to view bank account information may always be required by the wireless device 102 to use a secure WiFi router 116 that requires a user name and password or a cellular network 120.

It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). Additionally, newer standards include 4G and Advanced LTE.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for accessing a network site by a wireless device, the method comprising:
receiving a request to access a network site at the wireless device; and
accessing the network site at the wireless device through a network based upon at least two predefined weighted criteria settings, wherein one of the predefined weighted criteria settings is for a security setting, a speed setting, a power setting, or a cost setting, and one of the predefined weighted criteria settings is for an access setting related to content filtering, and wherein when the predefined weighted criteria access setting related to content filtering is highly weighted, the wireless device first attempts to access the network site using a fastest available network, and then automatically selects a cellular network to attempt to access the network site again once a firewall with content filtering rules is encountered.

2. The method of claim 1, wherein the network selected includes at least one of a wireless local area network (WLAN), a cellular network, or a wired network.

3. The method of claim 2, wherein the WLAN includes a public WLAN or a secure WLAN.

4. The method of claim 3, wherein, if the security setting is one of the predefined weighted criteria settings and is highly weighted, then the network selected includes the secure WLAN or the cellular network.

5. The method of claim 3, wherein, if the speed setting is one of the predefined weighted criteria settings and is highly weighted, then the network selected includes the public WLAN.

6. The method of claim 3, wherein, if the cost setting is one of the predefined weighted criteria settings and is highly weighted, then the network selected includes the public WLAN or the secure WLAN.

7. The method of claim 3, wherein, if the power setting is one of the predefined weighted criteria settings and is highly weighted, then the network selected includes the public WLAN or the secure WLAN.

8. A wireless device for accessing a network site, the wireless device comprising:
a network interface; and
a processor configured to execute operations including:
receiving a request to access a network site at the wireless device; and
accessing the network site through the network interface at the wireless device through a network based upon at least two predefined weighted criteria settings, wherein one of the predefined weighted criteria settings is for a security setting, a speed setting, a power setting, or a cost setting, and one of the predefined weighted criteria settings is for an access setting related to content filtering, and wherein when the predefined weighted criteria access setting related to content filtering is highly weighted, the wireless device first attempts to access the network site using a fastest available network, and then automatically selects a cellular network to attempt to access the network site again once a firewall with content filtering rules is encountered.

9. The wireless device of claim 8, wherein the network selected includes at least one of a wireless local area network (WLAN), a cellular network, or a wired network.

10. The wireless device of claim 9, wherein the WLAN includes a public WLAN or a secure WLAN.

11. The wireless device of claim 10, wherein, if the security setting is one of the predefined weighted criteria settings and is highly weighted, then the network selected includes the secure WLAN or the cellular network.

12. The wireless device of claim 10, wherein, if the speed setting is one of the predefined weighted criteria settings and is highly weighted, then the network selected includes the public WLAN.

13. The wireless device of claim 10, wherein, if the cost setting is one of the predefined weighted criteria settings and is highly weighted, then the network selected includes the public WLAN or the secure WLAN.

14. The wireless device of claim 10, wherein, if the power setting is one of the predefined weighted criteria settings and is highly weighted, then the network selected includes the public WLAN or the secure WLAN.

15. A wireless device for accessing a network site, the wireless device comprising:
  means for receiving a request to access a network site at the wireless device; and
  means for accessing the network site at the wireless device through a network based upon at least two predefined weighted criteria settings, wherein one of the predefined weighted criteria settings is for a security setting, a speed setting, a power setting, or a cost setting, and one of the predefined weighted criteria settings is for an access setting related to content filtering, and wherein when the predefined weighted criteria access setting related to content filtering is highly weighted, the wireless device first attempts to access the network site using a fastest available network, and then automatically selects a cellular network to attempt to access the network site again once a firewall with content filtering rules is encountered.

16. The wireless device of claim 15, wherein the network selected includes at least one of a wireless local area network (WLAN), a cellular network, or a wired network.

17. The wireless device of claim 16, wherein the WLAN includes a public WLAN or a secure WLAN.

18. The wireless device of claim 17, wherein, if the security setting is one of the predefined weighted criteria settings and is highly weighted, then the network selected includes the secure WLAN or the cellular network.

19. The wireless device of claim 17, wherein, if the speed setting is one of the predefined weighted criteria settings and is highly weighted, then the network selected includes the public WLAN.

20. The wireless device of claim 17, wherein, if the cost setting is one of the predefined weighted criteria settings and is highly weighted, then the network selected includes the public WLAN or the secure WLAN.

21. The wireless device of claim 17, wherein, if the power setting is one of the predefined weighted criteria settings and is highly weighted, then the network selected includes the public WLAN or the secure WLAN.

22. A non-transitory computer-readable medium comprising code for accessing a network site for a wireless device, the computer-readable medium comprising code for:
  receiving a request to access a network site at the wireless device; and
  accessing the network site at the wireless device through a network based upon at least two predefined weighted criteria settings, wherein one of the predefined weighted criteria settings is for a security setting, a speed setting, a power setting, or a cost setting, and one of the predefined weighted criteria settings is for an access setting related to content filtering, and wherein when the predefined weighted criteria access setting related to content filtering is highly weighted, the wireless device first attempts to access the network site using a fastest available network, and then automatically selects a cellular network to attempt to access the network site again once a firewall with content filtering rules is encountered.

23. The computer-readable medium of claim 22, wherein the network selected includes at least one of a wireless local area network (WLAN), a cellular network, or a wired network.

24. The computer-readable medium of claim 23, wherein the WLAN includes a public WLAN or a secure WLAN.

25. The computer-readable medium of claim 24, wherein, if the security setting is one of the predefined weighted criteria settings and is highly weighted, then the network selected includes the secure WLAN or the cellular network.

26. The computer-readable medium of claim 24, wherein, if the speed setting is one of the predefined weighted criteria settings and is highly weighted, then the network selected includes the public WLAN.

27. The computer-readable medium of claim 24, wherein, if the cost setting is one of the predefined weighted criteria settings and is highly weighted, then the network selected includes the public WLAN or the secure WLAN.

28. The computer-readable medium of claim 24, wherein, if the power setting is one of the predefined weighted criteria settings and is highly weighted, then the network selected includes the public WLAN or the secure WLAN.

* * * * *